United States Patent
Reinhard-Herrscher et al.

(10) Patent No.: US 9,271,522 B2
(45) Date of Patent: Mar. 1, 2016

(54) COOKING OVEN WITH OXYGENATING MEANS AND METHOD FOR OPERATING SAME

(75) Inventors: Fabienne Reinhard-Herrscher, Kirchberg/Jagst (DE); Thomas Fich Pedersen, Rothenburg o.d. Tauber (DE); Kersten Kaiser, Rothenburg o.d. Tauber (DE)

(73) Assignee: ELECTROLUX HOME PRODUCTS CORPORATION N.V., Zaventem (BE)

( * ) Notice: Subject to any disclaimer, the term of this patent is extended or adjusted under 35 U.S.C. 154(b) by 1124 days.

(21) Appl. No.: 12/602,664

(22) PCT Filed: May 16, 2008

(86) PCT No.: PCT/EP2008/003938
§ 371 (c)(1),
(2), (4) Date: Dec. 2, 2009

(87) PCT Pub. No.: WO2008/154991
PCT Pub. Date: Dec. 24, 2008

(65) Prior Publication Data
US 2010/0329972 A1  Dec. 30, 2010

(30) Foreign Application Priority Data
Jun. 21, 2007  (EP) .................................. 07012167

(51) Int. Cl.
F24C 15/32 (2006.01)
A23L 3/3409 (2006.01)
A23L 1/01 (2006.01)
F24C 14/00 (2006.01)
F24C 15/20 (2006.01)

(52) U.S. Cl.
CPC ............. *A23L 3/3409* (2013.01); *A23L 1/0135* (2013.01); *A23L 1/0142* (2013.01); *F24C 14/005* (2013.01); *F24C 15/2014* (2013.01)

(58) Field of Classification Search
CPC ........................... F24C 15/2014; A23L 3/3409
USPC ................................. 126/21 A, 20, 20.1, 20.2
See application file for complete search history.

(56) References Cited

U.S. PATENT DOCUMENTS

| | | | |
|---|---|---|---|
| 3,051,559 A | 8/1962 | Brite | |
| 4,072,762 A | 2/1978 | Rhodes | |
| 4,309,388 A * | 1/1982 | Tenney et al. | 422/304 |
| 5,015,442 A * | 5/1991 | Hirai | 422/121 |

(Continued)

FOREIGN PATENT DOCUMENTS

| | | | | |
|---|---|---|---|---|
| DE | 2405951 A1 * | 2/1974 | ............. | A47J 37/06 |
| DE | 2309563 | 12/1974 | | |

(Continued)

OTHER PUBLICATIONS

International Search Report for PCT/EP2008/003938, dated Sep. 9, 2008, 3 pages.

*Primary Examiner* — Kenneth Rinehart
*Assistant Examiner* — Gajanan M Prabhu
(74) *Attorney, Agent, or Firm* — Pearne & Gordon LLP

(57) ABSTRACT

The invention relates to a cooking oven (1), having a cavity (2) which is closable by a door (3). To reduce bacteria growth the invention is characterized in that oxygenating gas or ozone generating means (4) are provided for supplying at least a part of the cavity (2) or a region (5) adjacent to the cavity (2) with oxygenating gas or ozone.

15 Claims, 4 Drawing Sheets

(56) References Cited

U.S. PATENT DOCUMENTS

Figure 1:
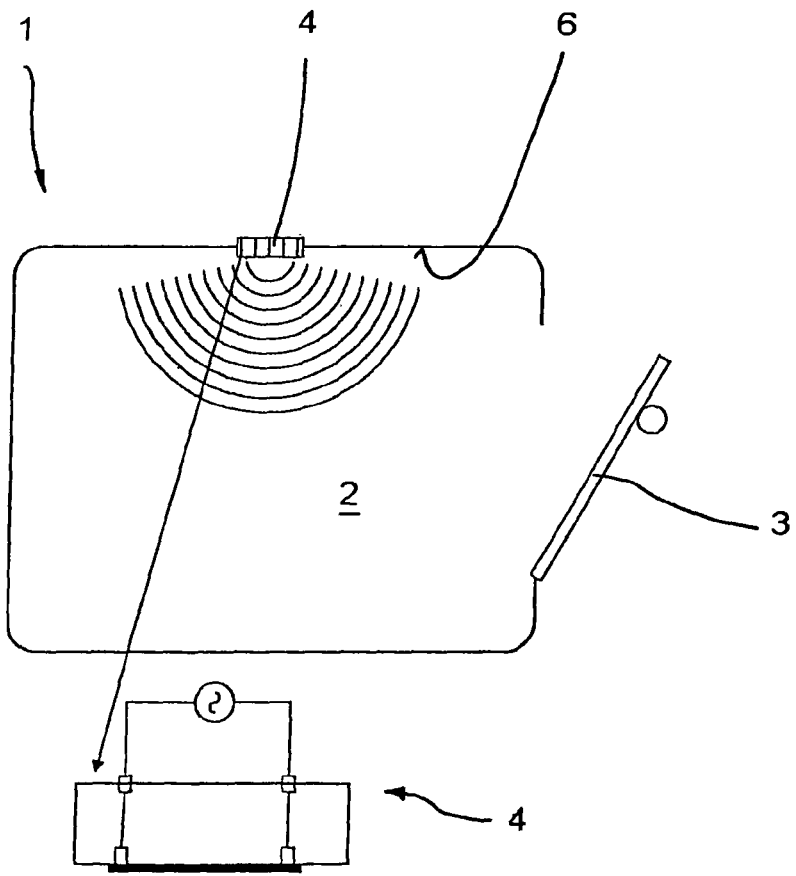

| | | | |
|---|---|---|---|
| 5,137,697 A * | 8/1992 | Lathan et al. | 422/186.15 |
| 5,525,782 A * | 6/1996 | Yoneno et al. | 219/682 |
| 6,766,106 B2 * | 7/2004 | Roberson | 392/442 |
| 6,913,012 B2 * | 7/2005 | Divett et al. | 126/21 A |
| 6,987,246 B2 * | 1/2006 | Hansen et al. | 219/401 |
| 7,024,761 B2 * | 4/2006 | Duenas Sanchez | 29/801 |
| 7,810,488 B2 * | 10/2010 | Manganiello et al. | 126/369.2 |
| 7,934,702 B1 * | 5/2011 | Feldstein | 261/4 |
| 2002/0122743 A1 * | 9/2002 | Huang | 422/24 |
| 2003/0082072 A1 * | 5/2003 | Koji et al. | 422/24 |
| 2007/0031281 A1 * | 2/2007 | Stevens | 422/24 |
| 2009/0264060 A1 * | 10/2009 | Livchak et al. | 454/61 |

FOREIGN PATENT DOCUMENTS

| | | |
|---|---|---|
| DE | 10211522 | 9/2003 |
| EP | 0730427 | 9/1996 |
| JP | 01184335 | 7/1989 |
| JP | 2006149272 | 6/2006 |
| KR | 20030015959 | 2/2003 |
| WO | WO 8909068 A1 * | 10/1989 |

\* cited by examiner

COOKING OVEN WITH OXYGENATING MEANS AND METHOD FOR OPERATING SAME

DESCRIPTION

The invention relates to a cooking oven, having a cavity which is closable by a door. Furthermore, the invention relates to a method for operating such a cooking oven.

Wellness and healthiness are becoming more and more important, also for the user of kitchen equipment, which are handling food while cooking etc. Here, a focus is to avoid growth and eliminate bacteria or other micro organisms like fungi. Also it is desired to reduce not wanted odours in the kitchen. Of course, those desires must not have any negative effect on the food and especially on the vitamin content of the food and must not be dangerous to the user of kitchen equipment.

Therefore, it is an object of the invention to equip a cooking oven in such a way that it becomes possible to avoid and/or eliminate bacteria or other not wanted micro organisms like fungi on the food without any drawbacks with respect to the quality of food and also to reduce undesired odours in the kitchen which are generated during operation of the cooking oven.

The solution of this object according to the invention is characterized in that oxygenating gas generating means especially ozone generating means are provided for supplying at least a part of the cavity or a region adjacent to the cavity with that gas.

According to one preferred embodiment of the invention the oxygenating gas or ozone generating means are arranged at or in a wall of the cavity.

Alternatively, the oxygenating gas or ozone generating means can be arranged in an air exhaust duct which is mounted adjacent to the cavity.

The cooking oven can be a steam oven wherein the oxygenating gas or ozone generating means are arranged in a steam generator. The oxygenating gas or ozone generating means can specifically be arranged in the water tank of the steam generator. Another possibility is that the cooking oven is a steam oven and that the oxygenating gas or ozone generating means are arranged in a steam exhaust unit.

A further embodiment employs a container or bag which is arranged in the cavity for receiving the oxygenating gas or ozone produced by the oxygenating gas or ozone generating means. The container or bag can be removably arranged in the cavity. The container or bag can be held in position in the cavity by at least one guide bar. Furthermore, the container or bag can consist of plastic material.

A catalytic filter element can be arranged between the oxygenating gas or ozone generating means and the cavity.

The oxygenating gas or ozone generating means can be a dielectric impeded discharge element or an UV lamp.

Furthermore, oxygenating gas or ozone degenerating means can be provided for degenerating oxygenating gas or ozone. The oxygenating gas or ozone degenerating means can use catalysis or steam.

The method for operating a cooking oven of the kind mentioned above is characterized in that a defined oxygenating gas or ozone concentration is maintained inside the cavity or a region adjacent to the cavity by operating oxygenating gas or ozone generating means and/or oxygenating gas or ozone degenerating means.

Preferably, the defined oxygenating gas or ozone concentration is variable with time.

Means can be employed for locking the door, which are actuated during maintaining the defined oxygenating gas or ozone concentration.

By the invention it is made sure that food is kept fresh inside the oven without cooling especially for cooking food later, e.g. by using an automatic timer.

Disinfection in the oven takes place which kills or reduces bacteria or fungi inside the oven.

I. e. using the oxygenating gas or ozone generated by the mentioned means food can be treated to kill present micro organisms to avoid spoilage. Also, those micro organisms can be killed to extend the storage time of the food. A further application is that odour can be reduced while unfreezing of food.

By the suggested apparatus and the respective method it becomes possible to efficiently avoid odours which would come into being without the invention.

In the drawings embodiments of the invention are depicted.

Figure 2:
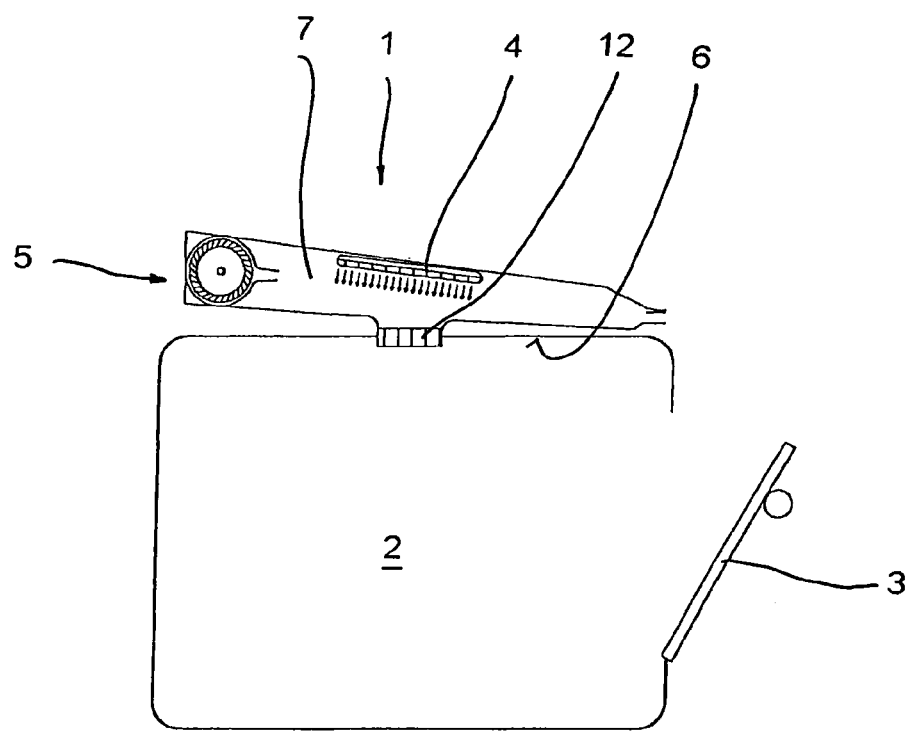
Figure 3:
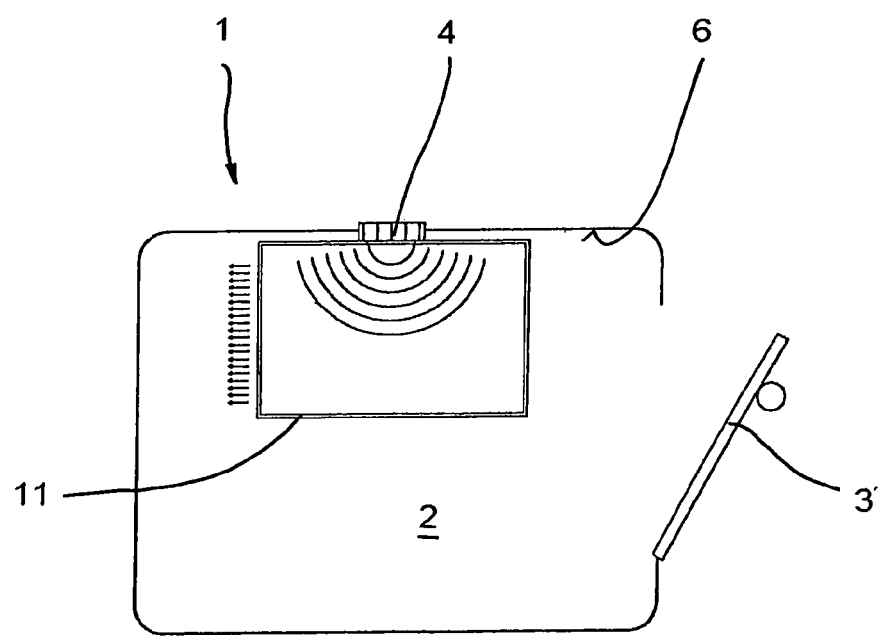
Figure 4:
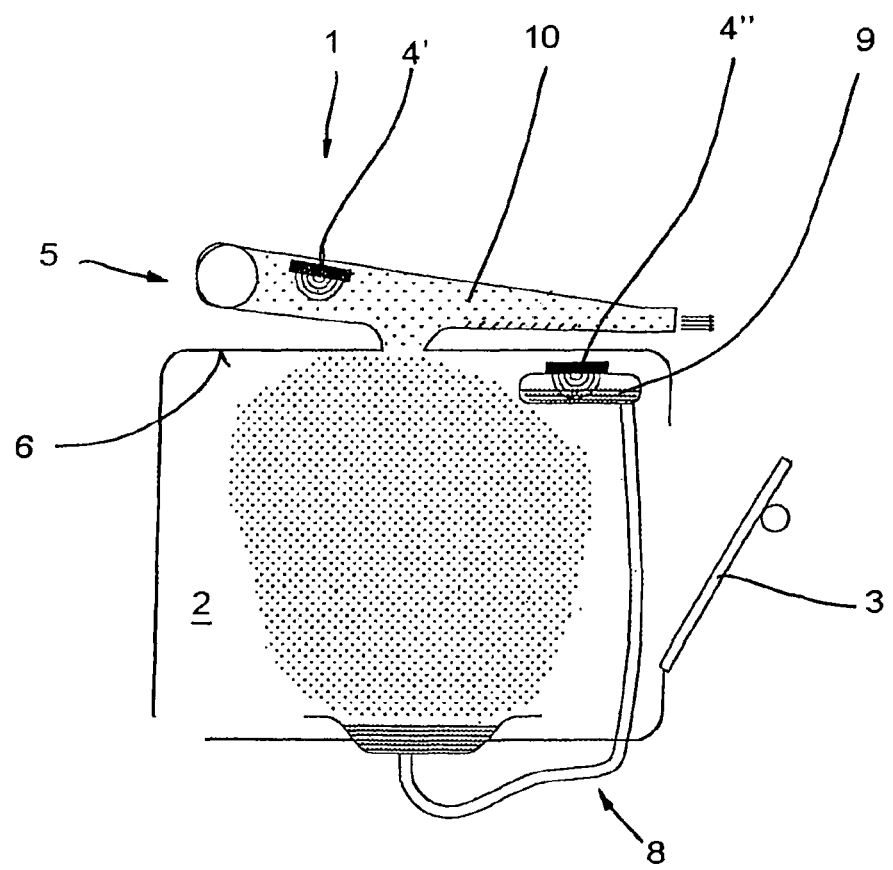

FIG. 1 shows schematically a side view of a cooking oven with a cavity, wherein oxygenating gas or ozone generating means are arranged at a wall of the cavity, FIG. 2 shows an alternative design of the oven according FIG. 1 wherein the oxygenating gas or ozone generating means are arranged in an air exhaust duct which is arranged on top of the cavity, FIG. 3 shows a further alternative design using a removable container which can be supplied with oxygenating gas or ozone from the oxygenating gas or ozone generating means, arranged at a wall of the cavity and FIG. 4 shows a steam oven wherein two oxygenating gas or ozone generating means are provided, one arranged in the air supply duct and the second arranged in the water tank.

Referring now to FIG. 1 a cooking oven 1 is depicted which has a cavity 2. The cavity 2 is closable by a door 3 in a well known manner. At the wall 6 here shown in the top of the cavity 2 oxygenating gas or ozone generating means 4 are mounted. In the lower part of FIG. 1 an illustration of the oxygenating gas or ozone generating means 4 are shown. The oxygenating gas or ozone generating means 4 can be e. g. a dielectric impeded discharger or an UV lamp; those means for producing ozone are well known in the art.

The ozone can be generated inside a closed plastic container by generating a high voltage high frequency field between foil electrodes on the outside of the container and a foil electrode on the inside of the container. The two sets of electrodes with the plastic between them act as a capacitor.

In FIG. 2 another embodiment of the invention is shown. Here, the oxygenating gas or ozone generating means 4 are not located in or at a wall of the cavity 2 but in a region 5 adjacent to the cavity 2. Specifically, the means 4 are arranged in an air exhaust duct 7 which leads hot air away from the cavity. From this drawing also another feature of a preferred embodiment can be seen: A catalytic filter element is supplied between the air exhaust duct 7 and the cavity 2 where generated oxygenating gas or ozone exhausts the cavity 2.

A further embodiment is shown in FIG. 3. Here the oxygenating gas or ozone generating means 4 are mounted at the wall 6 (shown in the top wall) of the cavity 2. In this case a container 1 is detachably arranged in the cavity 2, wherein the oxygenating gas or ozone generated by the means 4 is fed into the container 11. The container 11 can be held in position by guiding bars (not shown) to make it easy to insert the container 11 into the cavity 2 and to take it out of it. Instead a container also a bag can be employed.

By this concept it becomes possible to preserve e. g. vegetables or fruits before putting them into the refrigerator. The container 11 can be a closed box which is taken out from the cavity 2 after supply with oxygenating gas or ozone generating means; it can then be put into the refrigerator with the food in it. In this case the box 11 can be put back into the refrigerator after oxygenating gas or ozone generating means treatment.

It is also possible by this equipment to unfreeze food under oxygenating gas or ozone generating means influence to avoid bacteria growth and odours.

In FIG. 4 a steam oven 1 is shown which has a steam generator 8 which is well known in the art. Here, oxygenating gas or ozone generating means 4' are arranged in a steam exhaust unit 10. Further oxygenating gas or ozone generating means 4" are arranged in a water tank 9.

In this case the means 4', 4" make sure that a water disinfection for the steam production takes place and that no undesired odours are generated in the steam cooking mode. Of course it is also possible to employ only one of the means 4', 4".

A cleaning cycle can be carried out using the oxygenating gas or ozone generating function to kill micro organisms and odours.

In case of high oxygenating gas or ozone generating means concentrations inside the cavity 2 the mentioned functionality can be combined with an active or passive oxygenating gas or ozone generating means degeneration device using catalysis (FIG. 2) and/or steam in addition to a door lock.

REFERENCE NUMERALS

1 Cooking oven
2 Cavity
3 Door
4 Oxygenating gas or ozone generating means
4' Oxygenating gas or ozone generating means
4" Oxygenating gas or ozone generating means
5 Region adjacent to the cavity
6 Wall
7 Air exhaust duct
8 Steam generator
9 Water tank
10 Steam exhaust unit
11 Container
12 Catalytic filter element

The invention claimed is:

1. A cooking steam oven comprising: a cavity; a door, wherein the door is configured to close the cavity; an oxygenating gas generator or an ozone generator for supplying a region adjacent to the cavity with oxygenating gas or ozone, wherein the oxygenating gas generator or ozone generator is arranged in an air exhaust duct and wherein the air exhaust duct is configured as a part of the cooking steam oven; and an oxygenating gas degenerator or ozone degenerator is arranged in a region adjacent to the cavity for degenerating oxygenating gas or ozone.

2. Cooking steam oven according to claim 1, characterized in that a catalytic filter element is arranged between the air exhaust unit and the cavity.

3. Cooking steam oven according to claim 1, characterized in that the oxygenating gas generator or ozone generator is a dielectric impeded discharge element.

4. Cooking steam oven according to claim 1, characterized in that the oxygenating gas generator or ozone generator is an UV lamp.

5. Cooking steam oven according to claim 1, characterized in that the oxygenating gas degenerator or ozone degenerator is using catalysis.

6. A cooking steam oven according to claim 1, further comprising a steam generator and a steam exhaust unit, wherein the air exhaust duct is part of the steam exhaust unit.

7. A cooking steam oven according to claim 6, wherein the steam exhaust unit is arranged on top of the cavity.

8. A cooking steam oven according to claim 1, wherein the air exhaust duct is mounted adjacent to the cavity.

9. A cooking steam oven according to claim 1, wherein the air exhaust duct is arranged on top of the cavity.

10. A cooking steam oven according to claim 1, further comprising a connecting duct defining an enclosed space connecting the cavity to the air exhaust duct.

11. Method for operating a cooking steam oven (1) having a cavity (2) and a door (3), wherein the cavity is closable by the door, comprising: operating at least one of an oxygenating gas generator or ozone generator (4) and an oxygenating gas degenerator or ozone degenerator to maintain a defined oxygenating gas or ozone concentration inside the cavity or a region adjacent to the cavity, wherein the oxygenating gas generator or ozone generator (4) is arranged in a steam exhaust unit, wherein the steam exhaust unit is configured as a part of the cooking steam oven (1).

12. Method according to claim 11, characterized in that the defined oxygenating gas or ozone concentration is variable with time.

13. Method according to claim 11, characterized in that a lock on the door (3) is actuated during maintaining the defined oxygenating gas or ozone concentration.

14. A cooking steam oven (1), having a cavity (2) which is closable by a door (3), a steam generator (8) with a water tank (9), said water tank (9) being located inside the cavity (2), and an oxygenating gas generator or ozone generator (4) arranged to supply oxygenating gas or ozone respectively to water in the water tank (9).

15. A cooking steam oven according to claim 14, wherein the oxygenating gas generator or ozone generator (4) is arranged in the water tank (9) of the steam generator (8).

* * * * *